United States Patent [19]

Hacker

[11] 4,263,048

[45] Apr. 21, 1981

[54] SELF-HARDENING COMPOSITION AND COMPOSITE THEREFROM

[75] Inventor: Dennis J. Hacker, Albuquerque, N. Mex.

[73] Assignee: High Efficiency Insulation Technologies, Inc., Albuquerque, N. Mex.

[21] Appl. No.: 115,544

[22] Filed: Jan. 25, 1980

[51] Int. Cl.³ ............................................. C04B 19/04
[52] U.S. Cl. ........................................ 106/84; 428/453
[58] Field of Search ............................. 106/74, 84, 85; 428/453

[56] References Cited

U.S. PATENT DOCUMENTS

| | | | |
|---|---|---|---|
| 3,138,471 | 6/1964 | Wygant | 106/84 |
| 3,203,813 | 8/1965 | Gajardo et al. | 106/84 |
| 3,450,548 | 6/1969 | Petkus | 106/84 |
| 3,483,006 | 12/1969 | Vassilevsky et al. | 106/84 |
| 3,508,936 | 4/1970 | Lyass et al. | 106/84 |
| 3,837,872 | 9/1974 | Conner | 106/84 |
| 3,874,887 | 4/1975 | Dalmatov et al. | 106/84 |
| 3,933,514 | 1/1976 | Banks et al. | 106/84 |
| 4,030,939 | 6/1977 | Mallow | 106/84 |
| 4,066,463 | 1/1978 | Chollet | 106/74 |
| 4,138,268 | 2/1979 | Vogel et al. | 106/84 |

*Primary Examiner*—James Poer
*Attorney, Agent, or Firm*—Frank P. Cyr

[57] ABSTRACT

A self-hardening composition consists essentially of 3–5% by weight of an alkaline earth metal chloride, 0.5–1.5% by weight of calcium metasilicate, 0.5–1.5% by weight of sodium fluorosilicate, 30–40% by weight of sodium silicate, 0.02–0.04% by weight of aluminum silicate clay and water. Composites made therefrom can include expanded aggregate material and/or reinforcing fibers, as extenders, or to impart control over the open curing time to preset requirements.

11 Claims, No Drawings

SELF-HARDENING COMPOSITION AND COMPOSITE THEREFROM

BACKGROUND OF THE INVENTION

Many adhesives and bonding compounds in present use are derived from petrochemical or organic sources. These materials can emit toxic products or ignite in a fire, often resulting in ignition or degradation of particles bonded therewith to form further toxic products, exposure to which can be fatal in confined spaces.

Other bonding compounds adapted for compositions which will withstand extreme temperatures are kiln dried, fired or otherwise subjected to external heating to achieve satisfactory bonding, e.g., fired bricks, tiles, etc.

Vassilevsky et al, in U.S. Pat. No. 3,483,006, describe a cold-curable cementitious composition composed of MgO or semi-calcined dolomite, magnesium sulfate, an alkaline earth metal chloride ($XCl_2$), an alkali metal silicate ($Y_2SiO_3$) and an alkali metal fluorosilicate ($Y_2SiF_6$). The cement comprises two complex substances: a Mg(Ca)-oxychloro-sulfate and the combination of $XCl_2\text{-}Y_2SiO_3\text{-}Y_2SiF_6$.

Gajardo et al (U.S. Pat. No. 3,203,813) disclose an insulating material containing an aluminosilicate clay, a water-soluble alkali metal silicate, a foaming agent and an expanded siliceous inorganic aggregate, heated at 300°–400° F. to set the silicate.

Lyass et al (U.S. Pat. No. 3,508,936) obtain a self-hardening mixture for foundry molds containing filler, sodium silicate as binder, dicalcium silicate as hardener, a foaming agent and an abietic resin to increase the strength of the mold.

Other references on siliceous cement or concrete products include:

U.S. Pat. Nos. 3,138,471, Wygant; 3,450,548, Petkus; 3,837,872, Conner; 3,874,887, Dalmatov et al; and 4,030,939, Mallow.

OBJECT OF THE INVENTION

It is an object of the invention to provide a composition for insulating materials made by cold mixing various components to make a bonding compound that can be intermixed with particulate fillers such as expanded perlite, fiberglass, mineral fibers or wools or diatomite to form a paste. The paste can be molded, pressed or formed into structured products using conventional machines. The bonded products formed therefrom insulate against extremes of temperature but lose no bond strength and emit no toxic fumes when subjected to extreme heat or fires.

SUMMARY OF THE INVENTION

In a compositional aspect, this invention relates to a self-hardening composition consisting of 3–5% by weight of an alkaline earth metal chloride, 0.5–1.5% by weight of calcium metasilicate, 0.5–1.5% by weight of sodium fluororsilicate, 30–40% by weight of sodium silicate, 0.05–0.04% by weight of aluminum silicate clay and water.

In a further compositional aspect of this invention, self-hardening composites comprise 10–35% by weight of the foregoing composition, admixed with an expanded aggregate material or reinforcing fiber.

DETAILED DESCRIPTION

"Alkaline earth metal chloride," as used in the specification and claims, means $MgCl_2$ or $CaCl_2$ or a mixture thereof, preferably a 1:1 mixture thereof, represented by the formula $CaCl_2\cdot MgCl_2$.

Calcium metasilicate is represented by the formula $CaSiO_3$, whether in the α-(pseudowallastonite) or β-(wollastonite) form.

Sodium fluorosilicate, silicofluoride or hexafluorosilicate is represented by the formula $Na_2SiF_6$.

"Aluminum silicate clay," as used in the specification and claims, includes non-expanding clays, of which kaolinite, halloysite, illite and attapulgite are exemplary. However, kaolin is preferred.

"Sodium silicate," as used in the specification and claims is generally represented by the formula $Na_2SiO_3$ and is also known as water glass or sodium metasilicate. Sodium silicate includes products having various ratios of $Na_2O:SiO_2$. Typically, in the practice of this invention, sodium silicate is used in the form of a solution in which the $SiO_2:Na_2O$ molar ratio is 1.65:3.9. Preferred sodium silicate with a specific gravity of 1.387 at 499.3 per liter. Solutions of sodium silicate used in the practice of this invention will contain about 30–40% of solids, i.e., solutions of above approximately 34° Baumé will be used. Most preferably, the bonding compositions of this invention will contain 35–39% by weight of sodium silicates. Therefore, sodium silicate solutions above approximately 39° Baumé will be used.

The self-hardening compositions of this invention are made by combining the solid ingredients, for example, with paddles or mechanically opposed rotating arms. To this is added sodium silicate solution. Mixing is continued until the product has an acceptable viscosity, preferably of the order of 26 centipoise at 68.4° F. If the bonding composition is being used without fillers, the material is fabricated into the desired shape and permitted to set under ambient conditions. The time required for setting is dependent upon ambient temperature and open time required. Rule of thumb is 30 minutes at 60° F. ambient at which point the product has the following characteristics:

Conductivity is subject to fillers used and end product needs. As a rough guide, 25 mm at 18 lb/ft$^3$ will come out at 0.04–0.06 W/m° C., or better. Low temperatures range down to minus 100° C., or better, dependent upon known prior specifics. The bonded product has a hard rigid set and face. Natural color is pearl white. Crushing strength, without any other additions apart from perlite and bonding compound, is 40 kg/in$^2$. At the end of ½ hour, curing is complete as indicated by surface hardness.

Because the compositions of the invention are self-hardening, it will be understood that the ingredients are mixed just prior to use. If desired, the solid ingredients can be premixed and shipped dry. At the point of use, the solid ingredients can then be combined with sodium silicate solution.

In preferred embodiments, 10–35% by weight of the bonding composition is extended with an expanded aggregate material and/or reinforcing fiber material to provide fire-retardant lightweight air-curable composites.

"Expanded aggregate material," as used in the specification and claims, includes, but is not limited to, cellular perlite, vermiculite, cellular glass, expanded slag, cellular diatomite and cellular pumice. However, the foregoing are preferred, most preferably expanded or cellular perlite and cellular diatomite.

Reinforcing fibers include, but are not limited to, organic fibers and fiberglass. Fiberglass is preferred owing to resistance to combustion. Organic fibers include natural fibers such as cellulose and wood fibers and synthetic fibers, e.g., from ½ to 1½ inches in length.

In the practice of the invention, the filler being bonded is mixed with the cold self-hardening bonding composition to form a paste which is shaped by extrusion or pressing at 7–40 psi or higher pressures to the required shape, and predetermined product strength required.

Structured end products with densities of 10 to 39 lb/ft$^3$ may be obtained in this fashion.

The expanded aggregate material used in the practice of this invention can have a particle size of from 150 microns to 4750 microns depending upon the specifications of structured end product requirement. However, material mesh of 2400–4750 microns is generally preferred. The density of the expanded aggregate materials can be from 2½–11½ lb/ft$^3$ (40–180 kg/m$^3$), although aggregates having densities of 5½–11½ lb/ft$^3$ (90–180 kg/m$^3$) are preferred. Preferred sieve size of expanded perlite particles is 3000–6000 microns, with particle size (expanded) running from 3 mm to 7 mm.

Addition of inorganic viscosity increasing agents, e.g., sodium silicate in solution at 1.387–4.864 pounds per U.S. gallon to the basic bonding compound up to a level of 10% by weight will extend curing time. The curing time can be decreased by the addition of up to 8% by weight of inorganic filler, e.g., kaolin, diatomatious earth, fine mica, vermiculite, talc, etc. to the self-hardening composition or composites made therefrom.

The process of mixing of the basic self-hardening bonding compound and curing the products through stacking and shipping of structured end products is therefore carried out without application of external heat for drying or curing.

It will be understood that the composite materials containing the self-hardening composition of this invention can, while the composites are in the form of a paste of the required density, be formed, pressed or molded under varying pressures between sheets to form double- or single-faced laminates. Either facing sheet of the thus-formed laminate is of metal, cardboard, plastic, fiberglass, paper or any other material which will adhere to the composite material and which will dry and cure at ambient temperature. Preferred laminates are those wherein the filler is fiberglass and the facing sheet is metal or fiberglass.

DESCRIPTION OF PREFERRED EMBODIMENTS

With respect to the self-hardening composition of this invention, the most preferred embodiment is that wherein the alkaline earth metal chloride is $CaCl_2 \cdot MgCl_2$, the aluminum silicate clay is kaolin, the amount of sodium silicate is 35–39% by weight and the molar ratio $Na_2O:SiO_2$ is 1:1.65–3.9.

Of the composites prepared in accordance with the invention, one which is particularly preferred is that wherein the expanded aggregate material is cellular perlite, vermiculite, cellular glass, expanded slag, cellular diatomite or cellular pumice. Another particularly preferred composite contains both one of the foregoing types of aggregate and a reinforcing filler selected from fiberglass or mineral fiber.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following examples, the temperatures are set forth uncorrected in degrees celsius; unless otherwise indicated, all parts and percentages are by weight.

PREPARATION OF SELF-HARDENING COMPOSITION

EXAMPLE 1

The following dry ingredients were mixed together by a rotary mixer:

| | |
|---|---|
| Magnesium Calcium Chloride-$CaCl_2:MgCl_2$ | 4 |
| Calcium Metasilicate-$CaSiO_3$ | 1 |
| Sodium Fluorosilicate | 1 |
| Kaolin | 1/32 |

To the resulting dry mix was added 93 31/32% by weight of commercial sodium silicate solution (40.5° Baumé, $Na_2O:SiO_2$ ratio 1:1.65–3.9.). The mixture was stirred to a viscosity of 26 centipoise.

EXAMPLE 2

| | % by weight |
|---|---|
| Expanded Perlite Particles | 63–90 |
| Bonding Compound of Example 1 | 10–37 |

The particles to be bonded were first dry mixed together by mechanically opposed rotating arms and then mixed with the bonding compound in the cold state. The resulting mass was stirred to a paste, which was shaped by application of pressure from 15–38 psi into structural products.

EXAMPLE 3

| | % by weight |
|---|---|
| Fibers (Organic) | 68–84 |
| Diatomite | 5–17 |
| Bonding Compound of Example 1 | 23–35 |

The composite was mixed as in Example 2 and pressed at 17 psi to obtain structural products, which cured at ambient conditions within 1–3 hours to a product having the following characteristics: pearl white colored rigid board with perlite particles shape clearly visible. Capable to be handled and used, and, when tapped with the finger, gives a resonant solid sound.

EXAMPLE 4

| | % by weight |
|---|---|
| Expanded Perlite Particles | 25–56 |
| Organic Fibers | 32–45 |
| Bonding Compound of Example 1 | 18–29 |

A composite material was obtained as in Example 2.

EXAMPLE 5

| | % by weight |
|---|---|
| Expanded Perlite Particles | 60-85 |
| Fiberglass | 5-12 |
| Bonding Compound of Example 1 | 10-34 |

Composite material obtained as in Example 2 had the following characteristics: a rigid lightweight (17-22 lb/ft$^3$) dry-faced core material that had high thermal insulation qualities. Non-hygroscopic with free moisture content maximum 0.5%. Appearance: pearl white. Softening point: 900°-1100° C., 1600°-2000° F. Fusion point: 1280°-1350° C., 2300°-2450° F. Products structured from Examples 1, 2, 3, 5, 6, 7 were inert. Some unlaminated core material was made from Example 5, in accordance with the present invention, in the form of dry panels with a specific density of 27 lb/ft$^3$ in 1.0 meter lengths as cold mixed formed and cured panels. These panels were used to form a dry board encasement fire protection cover for a structural steel column and was submitted to a time and temperature test curve of: British Standard 476, part 8 (1972) in the following categories:

Dry panels encasement at 50 mm (2 inches) thick with no laminates either side:
  Stability: 120 min
  Re-load: Satisfied
  Fire resistance: 120 min Dry panels encasement at 25 mm (1 inch) thick with no laminates either side:
  Stability: 60 min
  Re-load: Satisfied
  Fire resistance: 60 min Further tests showed that the foregoing panels were completely incombustible and non-toxic when submitted to furnace temperatures of 2,000° F. for extended periods and not subject to loss of bond when direct flame in the same temperature range was applied to any face of the material for extended periods.

The foregoing examples relate to a rigid dry-formed panel, but, by the very nature of complete compounds and aggregates and by the very low psi pressures required to form a desired end product, it is possible to press and mold to any shape that is capable to be so produced from existing plant and equipment with a modification being made to the feed and pressure applied in order to retain the known and natural insulation qualities and geodetic strengths that are found in pre-expanded perlite particles of all grade sizes.

EXAMPLE 6

Composites containing up 55% of fiberglass (see Example 4) had better load-bearing characteristics and higher shear strength than those of Example 2.

EXAMPLE 7

Composites of the following compositions are prepared as in Example 2:

| | % by weight |
|---|---|
| Expanded Perlite Particles: large grade | 63-74 |
| Kaolin | 4-7 |
| Glass Fibers: one-inch long | 1-5 |
| Bonding Compound of Example 1 | 10-28 |

The products were structured as core materials having a nominal density of 15-28 lb/ft$^3$, and laminated on each face with aluminum foil, air-laid fiberglass sheeting, etc.

EXAMPLE 8

Bonding material was made as in Example 1 from the following:

| | % by weight |
|---|---|
| Magnesium Chloride | 4 |
| Calcium Metasilicate | 1 |
| Sodium Fluorosilicate | 1 |
| Kaolin | 1/32 |

To this dry mixture was added sodium silicate solution, 40°-42° Bé, the combination mixed to a viscosity of 26 centipoise.

Bonding material was formulated with expanded fillers and/or fibrous fillers as in Examples 2-7. The behavior of products was similar.

the preceding examples can be repeated with similar success by substituting the generically or specifically described reactants and/or operating conditions of this invention for those used in the preceding examples.

From the foregoing description, one skilled in the art can easily ascertain the essential characteristics of this invention, and, without departing from the spirit and scope thereof, can make various changes and modifications of the invention to adapt it to various usages and conditions.

What is claimed is:

1. A self-hardening composition consisting essentially of 3-5% by weight of an alkaline earth metal chloride, 0.5-1.5% by weitht of calcium metasilicate, 0.5-1.5% by weight of sodium fluorosilicate, 30-40% by weight of sodium silicate, 0.02-0.04% by weight of aluminum silicate clay and water.

2. The composition of claim 1, wherein the alkaline earth metal chloride is $CaCl_2.MgCl_2$.

3. The composition of claim 1, wherein the aluminum silicate clay is kaolin.

4. The composition of claim 1, wherein the amount of sodium silicate is 35-39% by weight.

5. The composition of claim 4, wherein the ratio $Na_2O:SiO_2$ is 1:1.65-3.9.

6. The composition of claim 1, wherein the alkaline earth metal chloride is $CaCl_2.MgCl_2$, the aluminum silicate clay is kaolin, the amount of sodium silicate is 35-30% by weight, and the molar ratio $Na_2O:SiO_2$ is 1:1.65-3.9.

7. A self-hardening composite material comprising 10-35% by weight of the composition of claim 1, admixed with an expanded aggregate material or reinforcing fibers.

8. A laminate comprising a composite of claim 7, firmly adhered to a facing sheet.

9. The composite material of claim 7, wherein the expanded aggregate material is cellular perlite, vermiculite, cellular glass, expanded slag, cellular diatomite, or cellular pumice.

10. The composite of claim 7, wherein the reinforcing fiber is fiberglass or mineral fibers.

11. The composite of claim 8, wherein the reinforcing fiber is fiberglass or mineral fiber and the expanded cellular aggregate material is cellular perlite, vermiculite, cellular glass, expanded slag, cellular diatomite, or cellular pumice.

* * * * *